United States Patent [19]

Schenkyr et al.

[11] Patent Number: 5,204,979
[45] Date of Patent: Apr. 20, 1993

[54] DIVERSITY RECEIVING METHOD AND APPARATUS FOR COMBINING A PLURALITY OF RAPIDLY CHANGING SIGNALS

[75] Inventors: Dieter Schenkyr, Kirchheim; Walter Buck, Stuttgart, both of Fed. Rep. of Germany

[73] Assignee: Richard Hirschmann GmbH & Co., Esslingen, Fed. Rep. of Germany

[21] Appl. No.: 499,534
[22] PCT Filed: Oct. 28, 1988
[86] PCT No.: PCT/EP88/00981
 § 371 Date: Jun. 28, 1990
 § 102(e) Date: Jun. 28, 1990
[87] PCT Pub. No.: WO89/04092
 PCT Pub. Date: May 5, 1989

[30] Foreign Application Priority Data

Oct. 31, 1987 [DE] Fed. Rep. of Germany ....... 3737011
Oct. 22, 1988 [DE] Fed. Rep. of Germany ....... 3836046

[51] Int. Cl.$^5$ ............................................. H04B 7/08
[52] U.S. Cl. .................................. 455/276.1; 455/139;
 455/277.2; 455/304; 455/337
[58] Field of Search ........................ 455/137–139,
 455/238, 272, 273, 275–278, 283, 303, 304, 309,
 312, 336, 337; 375/100, 97, 98, 99, 102

[56] References Cited

U.S. PATENT DOCUMENTS

| | | | |
|---|---|---|---|
| 4,079,318 | 3/1978 | Kinoshita | 455/139 |
| 4,334,316 | 6/1982 | Tanaka | 455/139 |
| 4,397,036 | 8/1983 | Hirade et al. | 455/137 |
| 4,512,034 | 4/1985 | Greenstein et al. | 455/139 |
| 4,710,975 | 12/1987 | Okamoto et al. | 455/276 |

FOREIGN PATENT DOCUMENTS 0199058 3/1986 European Pat. Off. .
0201977 5/1986 European Pat. Off. .

OTHER PUBLICATIONS

Review of the Electrical Communication Laboratories, vol. 25, No. 1, 2, Jan./Feb. 1977, Tokyo, Japan, "Space diversity reception for ocean microwave communication system", pp. 149–162 by Y. Okamoto.

Primary Examiner—Reinhard J. Eisenzopf
Assistant Examiner—Chi H. Pham
Attorney, Agent, or Firm—Robert J. Koch

[57] ABSTRACT

According to the receiving method for mobile reception has a plurality of individual receiving antennas, also known as diversity receiving method, on the individual antenna output signals an auxiliary modulation is superimposed and the antenna output signals are added to give a summation signal which as amplified selected intermediate-frequency summation signal is then demodulated in relation to amount and frequency or phase, the phase position of an individual signal in relation to the phase position of the summation signal and-/or the amplitude contribution of an individual signal to the amplitude of the summation signal thereby being determined. This information is utilized for optimizing the useful signal with a view to optimum interference suppression for example in that the phases and/or amplitudes of the high-frequency individual signals are changed in dependence upon the phase position and/or amplitude contribution determined. With low circuitry expenditure this then gives a substantially improved reception quality in mobile systems. Receiving antenna systems for carrying out the method are described.

34 Claims, 3 Drawing Sheets

DIVERSITY RECEIVING METHOD AND APPARATUS FOR COMBINING A PLURALITY OF RAPIDLY CHANGING SIGNALS

BACKGROUND OF THE INVENTION

1. Field of the Invention

The invention relates to a receiving method comprising a plurality of individual receiving antennas in which a phase modulation is superimposed on an antenna output signal, the antenna signals are summated and the summation signal amplitude demodulated. The invention also relates to a receiving antenna system for carrying out the method comprising a plurality of individual receiving antennas, a phase modulator, a summation circuit and an amplitude demodulator.

2. Description of the Related Technology

In mobile reception, for example reception of radio and/or television transmissions in motor vehicles, reception disturbances occur which considerably impair the reception. Such reception disturbances are due to the incidence of the radio or television waves on the antenna from more than one direction. This so called multipath reception occurs because the radio or television waves do not only reach the antenna directly from the transmitter but for example are reflected at buildings and also reach the receiving antennas along other paths. The reception paths for the plurality of signals received by the receiving antenna have different lengths so that in the radio and television signal, in particular with frequency-modulated carrier, interference disturbances occur, the resultant carrier thereby undergoing both an amplitude demodulation and a phase demodulation. The latter then given the annoying reception disturbances which considerably impair the reception and which due to the physical factors occur irrespective of the type of antennas employed, whether they are telescopic antennas, electronic short-rod antennas or electronic wind screen antennas.

In an article by R. Heidester & K. Vogt in NTZ 1958, No. 6, pages 315-319, a receiving antenna system is for example described which for reducing this interference occurring due to multipath reception comprises a plurality of individual receiving antennas for mobile reception. Associated with each individual antenna in this known arrangement is a receiver with which the amplitude of each individual signal of the respective individual antenna is continuously determined and monitored. The amplitudes determined are compared and the respective strongest signal of an individual antenna is used as reception signal. This type of diversity system, also referred to as parallel or receiver diversity system, is however very extensive and complicated in circuit technology because each antenna must be provided with a receiver. In addition, it is not certain that the individual antenna which furnishes the strongest antenna signal and is connected to the radio receiver in accordance with the aforementioned criterion necessarily furnishes the best signal, this being true in particular of frequency-modulated signals.

EP 0 201 977 A2, DE 3,334,735 A2 and the journal "Funkschau", 1986, pages 42-45, disclose for example a further receiving antenna system of the type mentioned at the beginning in which switching from one antenna to the other or from one linear combination of antenna voltages to other linear combinations is carried out when the reception quality drops below a predetermined threshold. This method, also known as scanning diversity or antenna selection diversity system, has however the substantial disadvantage that this switching operation is initiated only when interference has occurred. To achieve a transition between the antennas or linear combinations of antenna voltages which is satisfactory for the user and cannot be heard by him the switching over must take place extremely quickly and from the circuit technology point of view this is difficult, very complicated and then nevertheless only possible to a restricted extent. A further substantial disadvantage of this receiving system also resides in that an antenna furnishing a relatively poor reception signal which is however just beneath the switching threshold is kept in operation although other antennas furnish better reception signals with less interference. Furthermore, when interference occurs at the antenna which happens to be activated switching results to an arbitrarily selected following antenna or linear combination of antenna voltages which may also be disturbed or, as described above, lie just below the switching threshold. The reception properties of this diversity system are therefore not satisfactory.

DE 3,510,580 A1 discloses an antenna receiving method or system in which the phase of a reception signal is abruptly changed arbitrarily or statistically and the resulting amplitude change is measured. The setting of the optimum phase position in this case is by the "trial and error" principle in several steps. Thus, a phase change is initiated and it is determined whether this results in a better or worse total amplitude. The result is stored in each case in a processor. Thus, the "trial and error" method can at times also result in a deterioration of the reception conditions.

U.S. Pat. No. 4,079,318 discloses a known receiving method comprising a plurality of individual receiving antennas in which a phase modulation is superimposed on an antenna output signal by means of a phase modulator. In a summation circuit the phase-modulated output signal is added to the non-phase-modulated other antenna output signal. After frequency conversion and an intermediate frequency amplification in a conventional receiving circuit the summation signal is amplitude demodulated in a following amplitude detector and a synchronous detector. This gives a control signal with which a phase rotation element is continuously regulated so that the input signals of the summation circuit are brought to a uniform phase position.

This known method is intended for the transmission in the microwave range for reducing the socalled fading effects, the microwave transmission system receiving a single electromagnetic signal with two or more antennas. This known receiving method is thus intended for directional radio links and thus for stationary antennas. With this known control method the receiving lobes of directional radio antennas are caused to follow up to obtain an optimum reception with stationary receiving antennas. The follow-up takes place in minutes or hours, i.e. is relatively slow. There is no necessity for providing highspeed follow-up because the reception lobes, as stated, can change only slowly in said periods of time. An application of this known method to mobile radio, in particular the VHF radio reception in motor vehicles with a lowest transmitted frequency of 40 Hz, is thus not possible because in mobile reception follow-up times of less than 20 msec are necessary. The follow-up speed in mobile motor vehicle reception is thus several orders of magnitude faster. Moreover, the considerably longer follow-up times present in the known method can lead to noise in the audible range as will be explained below in detail regarding the prior art known from DE 3,510,580 A1.

A highspeed automatic control as is necessary for the reasons given in mobile radio diversity systems is not only unnecessary in stationary diversity systems but is impossible therein because of the interference which occurs. In the method known from U.S. Pat. No. 4,079,318 the one antenna output signal is phase-modulated with a low-frequency signal. The control must therefore necessarily take place slowly because with this low-frequency modulation the fluctuations of the interference quantities can be followed only with a relatively low speed. For this reason as well this known stationary diversity receiving method is not suitable for mobile radio diversity reception.

Furthermore, in the known method the frequency bandwidth for the baseband signal is also limited and the bottom frequency range cannot be utilized because of the low-frequency modulation signal. For this reason as well the known receiving method is not suitable for mobile radio diversity reception.

In the stationary diversity receiving systems in the microwave range the phase deviations due to the control operation then starting are relatively small and do not exceed 90° phase deviation. As a result the control signals also only lie within a narrow signal or voltage range. The control signal always remains proportional to the phase deviation. The drop of the control signal occurring at very large phase deviations and the indifferent range occurring at 180° phase deviation are not reached. In contrast, in mobile diversity systems large phase diviations and jumps extending over the entire phase range of 360° and high change rates (Rayleigh fading) are to be expected. In this case a control method as described in EP-02 27 015 A2 for stationary diversity systems could not be used because of the slow response and also because the regulation would become even slower in the event of indifferences.

A further basic difference between diversity receiving methods for stationary directional radio transmissions and mobile reception in motor vehicles resides in particular also in that the individual antennas in directional radio systems in contrast to mobile radio diversity antennas for example in motor vehicles always receive a signal whereas in mobile radio due to the very different incidence angle and characteristics each antenna can receive the signal in any phase and amplitude position up to complete absence. Thus, whereas stationary antennas for optical alignment with the receiving lobe only need to follow up relatively slowly, in the case of mobile diversity systems it is necessary not only to detect and process phase changes but also amplitude changes in extremely wide change ranges. This is not possible with the receiving method known from EP 02 27 015 A2.

SUMMARY OF THE INVENTION

The invention is therefore based ont he problem of providing a receiving method and a receiving antenna system which is suitable for mobile radio, in particular for motor vehicle radio reception, and is able to detect and process very fast changes of the signals received by the individual antennas, for example VHF signals, both as regards phase and amplitude over wide change ranges, and can utilize the information thus recovered for optimizing the diversity reception.

Proceeding from the receiving method known from U.S. Pat. No. 4,079,318 this problem is solved according to the invention in that on the individual antenna output signals an auxiliary modulation is superimposed in the form of a phase and/or amplitude modulation by means of an auxiliary modulation signal, the summation signal amplified and selected in a receiving circuit is demodulated in a frequency and amplitude demodulator in relation to magnitude and frequency and/or phase, the auxiliary modulation signal is filtered out of the demodulated signal and with the aid of synchronous demodulators real and imaginary parts of the individual antenna signal are determined in relation to the summation signal and therefrom the phase position and amplitude contribution of the individual signal in relation to the summation signal are derived, and the phases and/or the amplitudes of the high-frequency individual signals are each changed in dependence upon the determined phase position and/or the determined amplitude contribution in the direction towards optimum amplitude contribution.

On the basis of the steps according to the invention of superimposing an auxiliary modulation on the individual antenna voltages, subsequently adding all the antenna voltages and supplying the resultant summation signal to the receiving circuit, it is possible by evaluating the resultant modulation of the summation signal on demodulation thereof to determine the phase position of the individual antenna signals in relation to the phase position of the summation signal and/or the amplitude contribution of the individual signals to the amplitude of the summation signal. With the information obtained in this manner subsequent controls or switching operations can be carried out for optimizing the individual signals or the signal further processed int he receiver.

Due to the auxiliary modulation it suffices in the present invention to provide only one receiver. Nevertheless, information on all the antenna voltages is available so that said information can be used at any time for optimizing, controls and switching operations.

A further advantage of the receiving method according to the invention resides in particular also in that it reacts more or less continuously to deviations from the optimum and not only when interference has already occurred. In this manner substantially more time is available for the optimizing and for a control or switching operation than would be the case if it were necessary to wait for occurrence of interference.

Another advantage is that the receiving system is always aligned with the signal with the least interference irrespective of the starting conditions. This means that the receiving system does not stay with a certain receiving signal or a linear combination of receiving signals which lie or lies just beneath a switching threshold as is the case with conventional methods. On the contrary, continuous setting to a better antenna or a better linear combination of individual signals is effected and as a result the reception quality can be considerably increased.

Since in the receiving method according to the invention an in-phase summation of the individual antenna signals takes place signal energies of all the individual antennas can be utilized because the sum of all the antenna signals is thereby better than each individual signal and in particular interference of an individual antenna is statistically averaged out so that from this point of view as well a considerably improved reception quality is obtained. With the receiving method according to the invention it is also possible in the case of frequency-selective interference to generate a combined undisturbed reception signal from a plurality of disturbed individual signals. Also advantageous is that the receiving method according to the invention operates independently of selective attenuation by shading in travelling operation, also known as fading.

The auxiliary modulation of the individual antenna output signals must be evaluated for each signal in each case independently of the other signals. Thus, the modulation of the individual antenna output signals can be made in time succession. It is however also possible to carry out the auxiliary modulation for the individual antenna output signals with different frequencies, and the modulation can then possibly be made simultaneously.

Thus, in the diversity receiving method according to the invention the summation signal is thus demodulated not only in amplitude but also in quantity and phase in relation to the summation signal so that as regards both the phase position and the amplitude contribution a regulation or control is possible. Moreover, both the real and the imaginary part of the respective individual antenna signal is determined in relation to the summation signal so that apart from the amplitude and phase the sign is also obtained. Consequently, not only phase rotations but also jumps to opposite phase as involved in the zero passages typical for Rayleigh fading can be reliably detected and compensated in a single switching operation.

In contrast to aforementioned DE 3,510,580 A1 in the present method according to the invention both the phase and the amplitude of the individual signals in relation to the summation signal are uniquely measured and in dependence thereon a specific exactly defined setting of the phase elements made. The number of working steps is thereby considerably reduced. This has the advantage that correspondingly less switchovers are necessary and thus residual interference generated by switchovers is also substantially reduced in the present invention. For in order in the known arrangement to react fast enough before reaching a minimum, in the case of a fast automobile travelling for example at 150 kilometers per hours, when the time interval of two consecutive reception minima in the VHF range in the most favourable case is 1.5 metre/150 km/h, i.e. 36 milliseconds, the time of only 36 milliseconds/4=9 milliseconds per antenna thus must not be exceeded if the diversity system has four antennas. To avoid a minimum at least four measurements are necessary. This means that the measuring time is of the order of magnitude of 2.25 milliseconds, i.e. lies in a frequency of 440 Hertz. This frequency is however precisely in the range of maximum sensitivity of the ear so that the noise due to frequent switchover in the known circuit is considerable and any reception improvement possibly obtained are offset by this noise due to switchover. Since the auxiliary frequency lies in a measuring channel which is not used the useful signal is not influenced at all by the measurement.

The fundamental difference between the circuit arrangement known from DE 3,510,580 A1 and the present method resides in particular also in that the antenna signals are converted in mixers used therein to a different frequency. In contrast, the antenna signals int he present invention remain in the original frequency position, additional components only being added thereto. This means that with the adder used in the known method the summation is carried out in the intermediate-frequency range and not in the high-frequency range as is the case with the present invention. By definition, the following intermediate-frequency amplifier of the known method lacks the components necessary for frequency setting for a receiving circuit, for example r.f. circuit and mixer. These parts must be present separately for each antenna and this represents a considerable expenditure on circuitry. In contrast thereto, in the present invention the signals are added on the high-frequency side before the receiving circuit so that usual radio receivers with only very minor adaptations to the diversity system may be employed.

Moreover, the amplified and selected summation signal in the circuit arrangement according to DE 3,510,580 A1 is demodulated by the amplitude demodulator as total signal. In the present invention the amplified and selected summation signal is demodulated in relation to the magnitude and/or phase of the auxiliary modulation components. In contrast to the known circuit arrangement the phase information is only then slightly influenced by the interference amplitude modulation occurring in multipath reception. As a result information is obtained of substantially higher quality.

The diversity system described in EP 02 27 015 A2 is equipped with two receiving antennas. When using more than two receiving antennas all the differential phases must be measured. This requires n(n-1) measuring arrangements, i.e. a considerable apparatus expenditure. In contrast, in the present invention the phase separation of the individual signals in relation to the summation signal is made in a direction which is always clear and points to the optimum. The apparatus expenditure is limited to a number of amplitude modulators and phase rotation elements increasing linearly with the antenna number. The evaluating means itself is always present only once.

Preferably, the signal demodulated in relation to magnitude and frequency or phase is demodulated coherently with the auxiliary modulation signal. A selection of the auxiliary signal from the demodulated signal mixture is obtained. The thereby resulting in-phase components of the auxiliary modulation represent real and imaginary parts of the phase-shifted auxiliary modulation signal. If for example the auxiliary modulation is an amplitude modulation the synchronously demodulated output signal of the amplitude demodulation detector furnishes the real part. The frequency modulation demodulator furnishes the differentiated phase modulation signal. From this, with the aid of the synchronous demodulator the imaginary part shifted through 90° in phase is obtained.

If the synchronous demodulators in contrast to the previously described case are operated with the auxiliary modulation signal phase-shifted through 90°, in a circuit arrangement with ideal components, i.e. components which for example do not effect any distortions or other interferences of the signal to be processed, the output signal must disappear. Normally, the radio sets for use with the receiving method according to the invention are predetermined or exist. However, such radio sets are made up with components which are not ideal components. Consequently, the ideal state described above where the output signal disappears cannot be achieved. According to a further development of the invention the demodulated signal is therefore additionally coherently demodulated with the auxiliary modulation signal phase-shifted through 90° and the signal obtained in this manner used to compensate interference arising through non-ideal components necessary for implementation of the receiving method.

It is particularly advantageous in accordance with a further development of the invention when the auxiliary modulation is an amplitude and phase modulation for the ratio between the two modulation types to be controlled by the useful signal. In this manner disturbing influences depending ont he instantaneous signal state can be compensated.

A further embodiment of the invention resides in that the phases and/or the amplitudes of the high-frequency individual signals are changed in dependence upon the phase position determined and/or the amplitude contribution determined only in predetermined phase and/or amplitude states.

This means that certain preferred and in particular expedient states are predefined which are selected and set or activated correspondingly depending on the phase position determined and/or the amplitude contribution determined. In this manner it is also ensured in particular that only expedient and clear states are selected and set.

It is particularly advantageous in this connection to change the phases of the high-frequency individual signals in such a manner that only unilateral directional patterns are generated. This makes a multipath reception still more improbable.

As auxiliary modulation both a phase and an amplitude modulation is possible as well as a combination of these two modulation types.

A particularly preferred embodiment of the receiving method according to the invention resides in that the particular evaluated high-frequency individual signal is rotated in the direction of the phase of the summation signal. As will be described in detail below with reference to the example of embodiment, in this manner a continuous optimizing of the input signal for the receiving circuit is achieved in the sense that interference due to multipath reception is minimized particularly well. In this embodiment of the receiving method the respective high-frequency individual signal is rotated in the direction of the phase of the high-frequency summation signal, i.e. the phase of the high-frequency individual signal is controlled and varied in dependence upon the signal containing information on the phase position and/or the amplitude contribution of an individual signal in relation to the phase position or amplitude of the summation signal in such a manner that the phase of the high-frequency individual signal is aligned with the phase of the summation voltage. In this manner optimum interference suppression is obtained for the reception signal to be evaluated in the receiver.

On changing the phase of the respective high-frequency individual signal it is advantageous for the antenna patterns to be chosen so that they are substantially circular patterns which have a pattern form which is as uniform as possible. In this manner optimal directional patterns can be synthesized.

It is advantageous is the auxiliary modulation is consecutively superimposed on the individual antenna output signals in a predetermined clock sequence. The clock sequence should preferably be of the order of magnitude of milliseconds so that in the VHF range, i.e. in the 100 MHz range, with a vehicle speed of 150 km/hour a plurality of samplings per quarter-wavelength travelling distance is made.

An alternative embodiment of the invention resides in that the clock sequence is controlled by the speed of a vehicle, the signal for controlling the clock sequence preferably being derived from the tachometer of the vehicle. By controlling the clock sequence in dependence upon the vehicle speed the modulation clock sequence of the individual signals can be still further optimized.

A further development of the receiving method according to the invention resides in that the starting instant at which auxiliary modulations are superimposed preferably consecutively ont he individual antenna output signals is controlled by the useful signal itself. This is particularly advantageous when the clock sequence is triggered on occurrence of the zero passage of the useful signal. In this manner it is ensured that the corresponding measurement of the phase position of an individual signal in relation to the phase position of the summation signal and/or of the amplitude contribution of an individual signal to the amplitude of the summation signal is always carried out at the same frequency in the transmission channel. As a result, no measurement errors can arise due to different frequencies or amplitudes of the useful signal.

A particularly advantageous further development of the receiving method according to the invention resides in that from the antenna output signals linear combinations are formed on which the auxiliary modulation is superimposed. This means that the auxiliary modulation is not superimposed on the antenna output signals but on linear combinations thereof. The use of linear combinations of the antenna output signals makes it possible to improve still further the interference suppression in receiving systems.

As in the example of embodiment already explained according to which the individual antenna patterns are at least approximately circular patterns it is also advantageous here for the same reasons if the antenna patterns formed by linear combination are at least approximately circular patterns.

In particular, a further development of the method according to the invention is very advantageous in which the modulation parameters of the modulated antenna output signals are selected in such a manner that the auxiliary modulation frequencies occur in an unused frequency range of a transmission channel. This thus applies also to the modulated summation signal. It is ensured in this manner that the signals themselves are not disturbed by the modulations according to the method described here.

The invention can be applied advantageously to the reception of stereo multiplex signals. In this case the spectral components added by the auxiliary modulation to the antenna signal or linear combinations should lie in a frequency range outside the useful range, i.e. above 57 kHz and/or around 17 and/or 21 kHz.

A further development of the invention resides in that as control or switching signal, for instance for rotating the particular evaluated high-frequency individual signal in the direction of the phase of the summation signal, a digital signal is employed. For this purpose, according to the invention the phase difference between the respective individual signal and the summation signal and/or the amplitude contribution of an individual signal to the amplitude of the summation signal is converted to a digital signal.

The quantization of the phase may be chosen as desired but preferably a 2-bit or a 3-bit quantization of the phase is selected, corresponding to a ±90° or a ±45° angle. The analog-digital conversion can thereby be limited to a simple threshold detection so that the circuit arrangement is still further simplified. A quantization with higher bit number does not in practice provide any appreciable improvement of the reception quality. Even a 1-bit quantization with a ±180° switching angle already gives an appreciable improvement in the reception quality.

According to a further advantageous embodiment of the invention an individual receiving antenna is deactivated when the amplitude contribution of an individual signal to the summation signal drops below a predetermined threshold value. This is made possible by information on the amplitude of the individual signals being present so that in dependence upon this information for example in the manner described above individual antennas are deactivated or other switching steps additionally executed. The use of this information on the amplitude for deactivating the individual antennas with small reception signal component is however particularly advantageous because such antennas with small amplitude component make substantially only a noise contribution to the overall system and are thus in effect disadvantageous. The reception signal of such a disconnecting antenna can nevertheless still be continuously measured if the carrierless two-sideband-modulated signal of the antenna is supplied to the summation signal.

A further preferred embodiment of the invention resides in that the auxiliary modulation is superimposed on the respective individual signals during a predetermined time interval per period of the useful signal. It is ensured in this manner that the superimposing of the auxiliary modulation on the respective individual signal is made at a defined point of time, preferably when at said fixed point of time a predetermined constant amplitude is present. This embodiment is particularly advantageous when the useful signal is a video signal and the auxiliary modulation is superimposed during the line or frame blanking interval of the respective individual signal. The line or frame blanking interval has substantially the same amplitude in each period. As a result constant defined conditions are given and no measuring errors of the system can arise due to different levels as would be the case if the auxiliary modulation were superimposed during the interval in which the actual video information is transmitted with different amplitudes. Through this further feature the modulation of the individual signal is subjected to a time condition so that within the period a sort of time-multiplex method results.

A further embodiment of the invention also provides that the receiving method is deactivated or activated entirely or partially in dependence upon a control signal. Of course, relatively strong interference signals occur when electrical auxiliary motors for example for rearview mirror adjustment or windscreen wipers are switched on. In dependence thereon, individual antennas can be deactivated or other steps taken for influencing the overall system.

According to a further development it is also possible to activate the receiving method only when a predetermined interference threshold is exceeded. For example, for determining whether the interference level has exceeded a predetermined threshold value an interference detector may be provided.

The transmission behaviour of the receiving circuit in practice is not ideal as regards the phase and/or amplitude profile so that errors can occur in the determination of the phase position and the amplitude contribution of the individual signals in relation to the phase and amplitude of the summation or composite signal. To compensate these errors it is advantageous if in accordance with a further embodiment of the invention on the summation signal for calibration a further predetermined defined auxiliary modulation is superimposed by means of a calibration signal. Thus, with this additional feature with the aid of a calibration signal calibration of the receiving circuit is performed so that errors of the receiving circuit which may negatively influence the transmission of the signals can be compensated. The calibration signal can be processed in a manner analogous to that provided for the auxiliary modulation signal for the individual antenna output signals so that the aforementioned embodiment can also be applied to the calibration signal.

In conjunction with the latter embodiment it is advantageous for the further auxiliary modulation to be identical to the auxiliary modulation which is superimposed on the individual antenna output signals.

According to a further development of the invention the further auxiliary modulation used for the calibration is superimposed on a summation signal which is formed from a subset of the antenna output signals and which presumably comes closest to the summation signal resulting after the change of the phase and/or amplitude of the measured individual signal. With this embodiment a faster approximation to the optimum summation signal obtainable is possible because the individual signal subjected to the change is not contained in the subset of the antenna output signals used to form the reference signal. If for example individual antenna output signals have been found to be particularly disturbing with the aid of an interference detector, these signals can also be excluded from the formation of the reference signal.

In conjunction with the previously described features of the invention it is furthermore advantageous if on the individual antenna output signals except for the antenna output signal to be changed an auxiliary modulation is imposed in the form of a phase and/or amplitude demodulation by means of an auxiliary modulation signal and that at the same time the auxiliary modulation is superimposed on the antenna output signal to be changed with opposite sign. It is possible with this embodiment to double the effective modulation depth of the antenna output signal to be changed compared with the modulation depth achieved with exclusive modulation of a single antenna signal. This makes it possible to achieve a high signal-noise ratio for the same modulation distortions.

A further advantageous development of the invention resides in that the modulation of the summation signal is effected by simulataneous modulation of all the antenna output signals. This is an alternative to the embodiment in which on the summation signal for calibration a further predetermined defined auxiliary modulation is superimposed by means of a calibration signal.

In the latter case, i.e. when on the summation signal for calibration a further predetermined defined auxiliary modulation is superimposed by means of a calibration signal, it is advantageous to provide a modulator between the summator and receiving circuit.

The problem set is solved according to the invention also with a receiving antenna system which has the following features:

A modulator which follows the individual receiving antennas and which superimposes on the individual antenna output signals an auxiliary modulation by means of an auxiliary modulation signal ($S_H$), a demodulator which demodulates the summation signal amplified and selected in a receiving circuit in relation to quantity and/or frequency and/or phase, a filter which filters the auxiliary modulation signal from the demodulated signal, a synchronous demodulator which determines the real and imaginary parts of the individual antenna signal in relation to the summation signal and derives therefrom the phase position and amplitude contribution and a phase and/or amplitude setting member which is or are controlled in dependence upon the output signals of the synchronous demodulators.

For a particularly economical version the demodulator can consist only of a frequency or amplitude demodulator. For this, the demodulator int he radio set may be employed.

It is advantageous for a synchronous demodulator to be connected after the demodulator for coherent demodulation with the auxiliary modulation signal. As already described, in this manner it is possible to make a selection by real and imaginary parts and thus determine the sign and as a result the phase position and the amplitude contribution of the respective individual signal in relation to the summation signal can be clearly determined.

According to a particularly advantageous embodiment of the invention between the respective modulator and the summation circuit a phase and/or amplitude control element is provided. The output signal of the demodulator is supplied to the phase control element so that the particular evaluated high-frequency individual signal can be rotated in the direction of the phase of the summation signal. This gives a continuous fast optimizing of the useful signal with regard to interference reduction.

It is particularly advantageous to provide between the demodulator and the respective phase shift element an analog/digital converter. In this manner the control of the respective phase shift element is made digitally in dependence upon the output signal of the demodulator and this leads to simplification of the circuit arrangement.

Preferably, the modulators connected to the antenna outputs are activated consecutively by means of a clock generator. Said clock generator may be fixed as regards its clock frequency or alternatively controlled by the demodulator output signal or otherwise controlled.

According to an alternative configuration of the invention it is possible instead of in time succession to carry out the measurement for each antenna output signal or each linear combination of antenna output signals, using for each signal a different frequency, auxiliary frequency generators and synchronous demodulators then accordingly having to be multiply present.

A further development of the invention resides in that the modulators are preceded by a matrix circuit which forms linear combinations from the antenna output signals. By linear combinations of the actual antenna output signals a decorrelation and norming of the combined signals can be achieved and thus a further improvement of the reception properties and interference suppression of the receiving antenna system according to the invention.

The demodulator advantageously includes an amplitude demodulator. It is particularly advantageous for the amplitude demodulator to be a quasi synchronous demodulator. In this manner a demodulation is effected by mixing with the recovered signal carrier of the reception signal amplitude-modulated with the auxiliary modulation. The signal carrier is recovered by limiting the reception signal. As a result, in the case of common-channel interference for example in the FM radio reception range only the quantity of the reception signal stronger at that instant is measured. As a result, on changing from one transmitter to the other the summation signal can become stronger before the modulation thereof is taken on.

The invention will be explained hereinafter with the aid of an example of embodiment for sound ratio reception.

DETAILED DESCRIPTION OF THE PREFERRED EMBODIMENT

Figure 1:
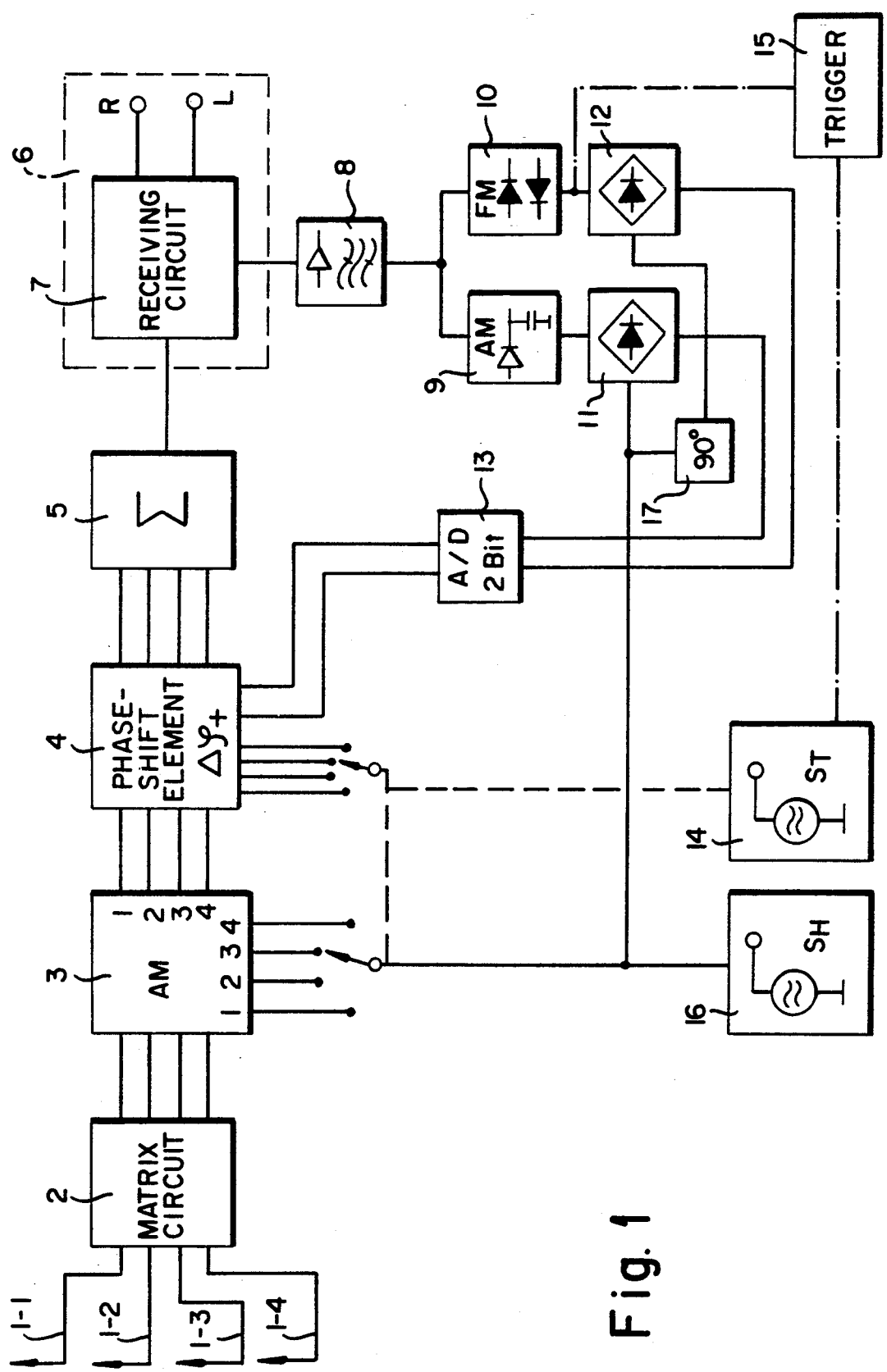
FIG. 1 shows in schematic illustration a circuit arrangement to explain the receiving antenna method or system according to the invention.

Via individual antennas 1-1, 1-2, 1-3, 1-4 the antenna output signals are applied to a matrix circuit 2 at the outputs of which respective linear combinations of the antenna input signals are made available. Such matrix circuits are generally known and described for example in EP O 201 977 A2 so that they need not be discussed in detail here. The outputs of the matrix circuit 2 are each connected to an input of an amplitude modulator 3. As will be further described in detail below, an auxiliary modulation is consecutively superimposed on the signals present at the inputs of the amplitude modulator 3, the time clock sequence being controlled via the clock signal inputs in such a manner that depending on the clock signal input to which the clock signal is applied the corresponding input signal occurs amplitude-modulated at the associated output of the amplitude modulator 3. The amplitude modulator 3 shown schematically as an array consists of four separate amplitude modulator stages which each receive one of the output signals of the matrix circuit. The individual separate amplitude modulator stages are activated in time succession in dependence upon the clock signal and correspondingly furnish in time succession the correspondingly amplitude-modulated high-frequency input signals.

The amplitude modulator 3 is followed by a phase-shift element 4 which for the respective amplitude-modulated high-frequency input signals via clock signal inputs from the same clock signal which is also applied to the amplitude modulator 3 effects the phase rotation consecutively occurring for the input signals. As will be explained in detail below a signal controlling the phase rotation is supplied to the phase-shift element 4. The phase-shift element 4 consists of four separate phase-shift elements which are each associated with a respective output of the amplitude modulator 3 and are consecutively activated corresponding to said clock signal. The output signals of the phase-shift element 4 are added in a summation circuit 5 and supplied to the input of a radio receiver 6 comprising a receiving circuit 7. In the case of stereo reception the output signals R and L pass via corresponding lines to the respective loudspeakers.

An intermediate-frequency output signal of the receiving circuit 7 withdrawn from said circuit prior to the limiter stage passes via an amplifier and filter stage 8 to an amplitude and frequency demodulator 9 and 10 respectively which are each followed by a synchronous demodulator 11 and 12 respectively. Said demodulators 9, 10, 11 and 12 are circuits with which the expert is familiar. The output signals of the synchronous demodulators 11 and 12 following the amplitude and frequency demodulators 9 and 10 pass to an analog/digital converter 13, the output of which is connected to the control input of the phase-shift element 4.

A clock signal generator 14 in the form of an oscillator circuit generates the already mentioned clock signal $S_T$ which for successive activation of the amplitude modulator 3 and the phase-element 4 is applied to the clock signal inputs of said circuits. The clock signal generator 14 is controllable as regards its starting instant with the output signal of the frequency demodulator 10 via a trigger circuit 15.

An auxiliary modulation signal generator 16 provides the respective clocked and thus activated input of the amplitude modulator 3 with the auxiliary modulation signal $S_H$ for consecutive modulation of the respective high-frequency individual signal. Said auxiliary modulation frequency individual signal. Said auxiliary modulation signal $S_H$ also passes to the synchronous demodulator 11 following the amplitude demodulator 9 and with a phase shift of 90°, effected in a phase shifter 17, to the synchronous demodulator 12 which follows the frequency demodulator 10.

The mode of operation of the example of embodiment illustrated schematically will be explained below with reference to FIG. 2.

The auxiliary modulation $S_H$ is superimposed on the output signals of the antennas 1-1, 1-2, 1-3, 1-4 or the linear combinations of the antenna output signals generated in the matrix circuit 2 corresponding to the clock sequence defined by the clock signal. Preferably, the modulation parameters are chosen so that the resultant spectrum lies in an unused range of the stereo multiplex signal, for example at 62 kHz. The output signals of the amplitude modulator 3, i.e. the modulated individual signals, pass via a phase-shift element 4 in each case to the summation circuit 5 which forms from the individual signals a summation signal which, as already mentioned, is taken as intermediate-frequency signal from the receiving circuit 7 and amplified and filtered int he amplifier and filter stage 8.

In the amplitude and frequency demodulator 9 and 10 the signal mixture is demodulated by the two detectors in relation to magnitude and phase. Thereafter, by the synchronous demodulators 11 and 12 real and imaginary parts of the auxiliary modulation signals and their sign are determined. The output signals of the synchronous demodulators 11 and 12 contain as real and imaginary parts the information on the amplitude contribution of an individual signal to the amplitude of the summation signal and the phase position of an individual signal in relation to the phase position of the summation signal. These signals are quantized in the analog/digital converter 13 for example with two bits and pass to the phase-shift element 4 effecting the corresponding phase rotation.

Figure 2:
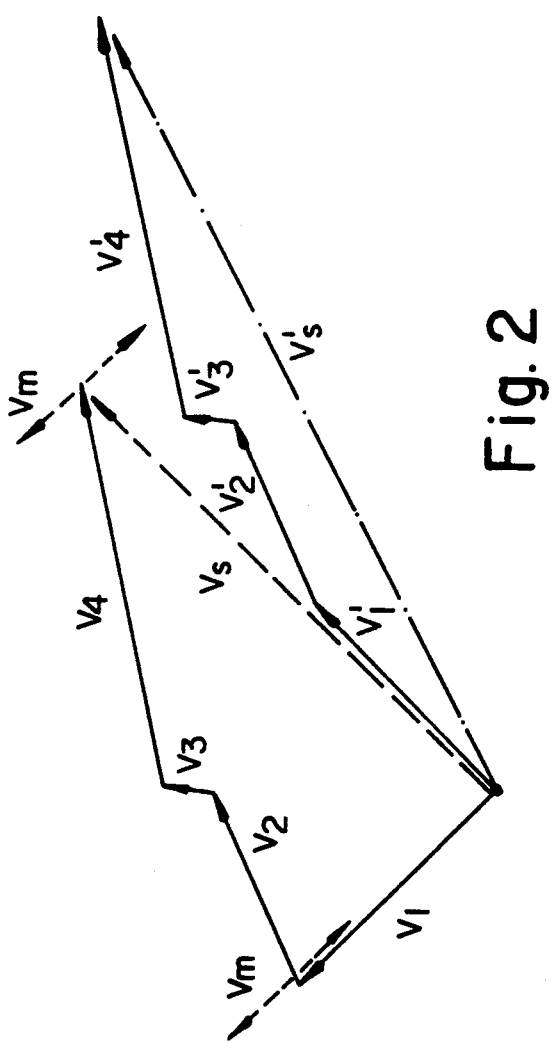
FIG. 2 shows a diagram of the signals in vector representation to explain the mode of operation of the method and system according to the invention.

As stated, the output signals of the synchronous modulators 11 and 12 contain the information relating to the phase position of the individual signal relatively to the phase position of the summation signal and accordingly the phase-shift element is controlled in such a manner that in dependence upon the instantaneously present phase position and the instantaneously present amplitude contribution to the summation signal for the measured individual signal it alters the phase thereof in the manner which will be explained below with the aid of FIG. 2.

In FIG. 2 the phase positions of the individual signals are represented by full-line vectors $V_1$, $V_2$, $V_3$, $V_4$ which form a sum vector $V_S$ shown in dash line. Now, in the output signal of the synchronous demodulators 11 and 12 for example for the individual signal V the information on the magnitude of the phase difference of said signal from the summation signal V is contained. Accordingly, this signal digitized in the analog/digital converter 13 causes the phase-shift element 4 for the present modulated input signal to effect a phase shift through said phase difference, in the present case of quantization with 2 bits through 90°, and thus performs an alignment of the phase angle of the vector of the individual signal $V_1$ with the summation signal $V_S$. The individual signal $V_1$ shifted in phase is represented by the vector $V'_1$.

With a finer quantization of the phase the remaining vectors could be adapted in corresponding manner to the phase of the summation signal $S_S$. Corresponding to steps of 90°, however, as described in the present case only the individual signal $V_1$ is rotated in phase because it differs by more than 45° from the phase angle of the summation signal $V_S$. However, quantization of the phases with 2 bits suffices in most cases as is apparent from FIG. 2 with regard to the new summation signal $V_S$, with the shifted individual signal $V_1$.

In FIG. 2 at the end of the arrow of the individual signal vector $V_1$ the vectors for the auxiliary amplitude modulation $V_S$ are shown. In the present case the phase of the individual signal vector $V_1$ is turned through about 90° in relation to the summation signal $V_S$. As a result the amplitude modulation is converted to a phase modulation.

Since as described the output signals of the synchronous demodulators 11 and 12 also contain information on the amplitude contribution of the individual signal to the amplitude of the summation signal this information can also be used for a great variety of control and switching operations. It is advantageous for example to deactivate a specific individual antenna by means of said signal when the amplitude quantity of the individual signal received by said antenna makes only a small contribution to the summation signal. The noise contribution of this individual signal to the total signal thus predominates and is therefore only detrimental to the total signal.

The clock sequence with which a switchover is made from one antenna output signal or from one linear combination to the next antenna output signal or next linear combination of output signals for amplitude modulation, i.e. the frequency of the clock signal $S_1$, can be selected in accordance with the requirements and can be constant. In the example of embodiment illustrated the clock sequence is controlled via the trigger circuit 15 by the useful signal itself so that an optimum starting instant for the successive modulation of the antenna output signals or the linear combination of antenna output signals is obtained together with corresponding activation of the phase-shift element for the corresponding high-frequency individual signal.

The receiving antenna system may also be characterized in that with each antenna output signal or each linear combination of antenna output signals in each case a separate auxiliary modulation signal generator each having a different frequency and in each case separate synchronous demodulators are associated.

The present invention has been described with reference to a preferred example of embodiment with four antennas. The method and system are however suitable for more or less than four antennas. It is for example also advantageous to supply to the phase-shift element 4 the clock signal $S_T$ via a delay member so that the phase-shift element 4 is not switched until the measurement is concluded.

Figure 3:
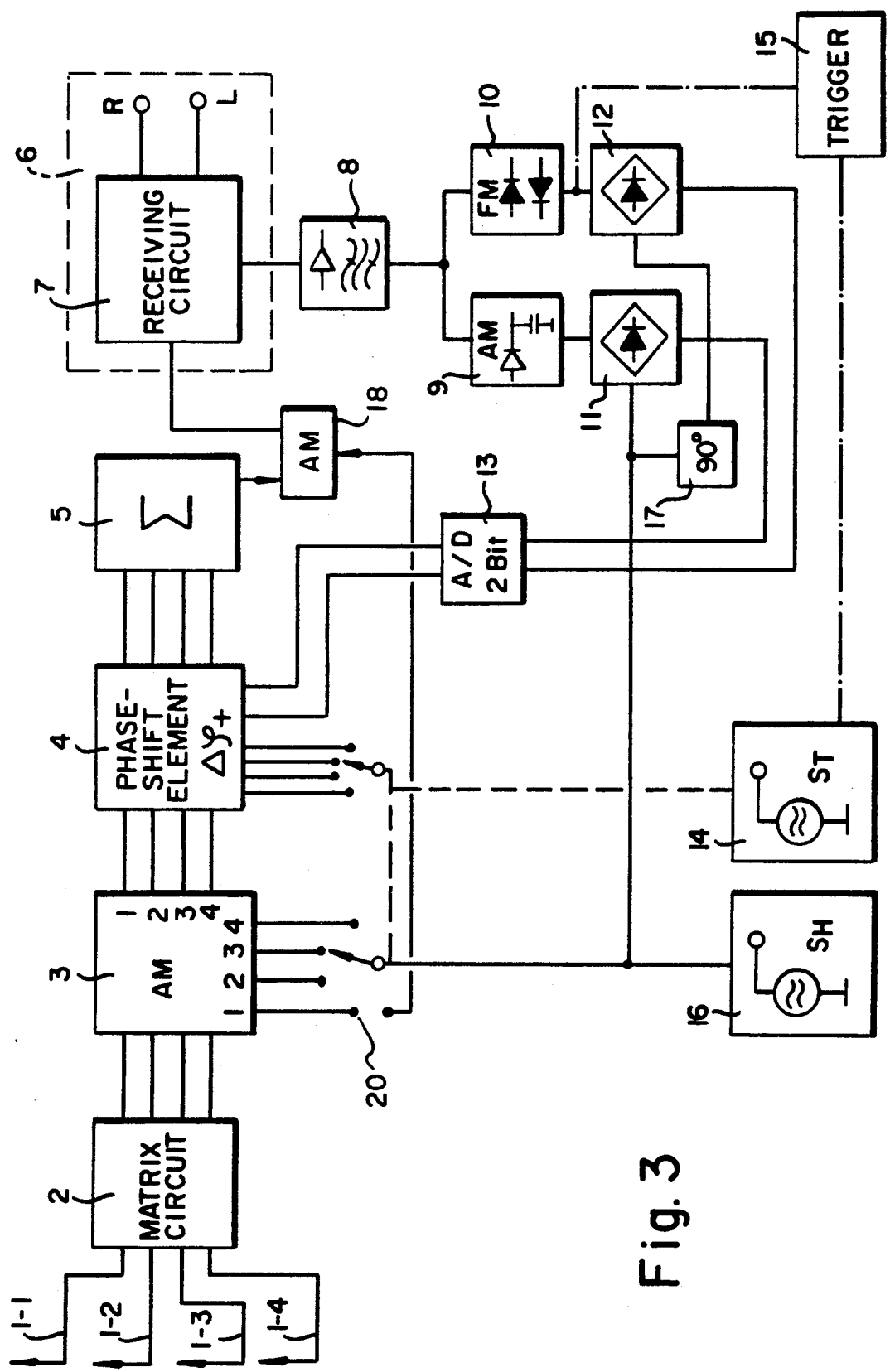
FIG. 3 is a schematic block diagram illustrating a preferred embodiment of the present invention.

Advantageously, the signal of the auxiliary modulation signal generator 16 is supplied to the synchronous demodulators 11 and 12 via a delay member. This makes it possible to compensate delays due to the receiving circuit 7, the amplifier and filter circuit 8 and the demodulators 9 to 12. Referring to FIG. 3, the auxiliary modulation 16 may be consecutively superimposed on the individual antenna output signals in a predetermined clock sequence by means of switch 20 connecting modulation 16 sequentially to each respective modulation input of modulator 3 corresponding to each antenna output signal. Furthermore, modulation 16 may also be connected to post summation modulator 18 for use in calibrating the system of the present invention.

We claim:

1. A method for diversity reception of radio signals using at least two receiving antennas where the output signal of each receiving antenna is modulated by an auxiliary modulation signal, phase shifted, combined in a summation circuit, amplified and selected in a radio receiver, coherently demodulated, then used to control the amount of phase shift made to each antenna output signal such that the resultant signal summation is maximized for best reception, comprising the steps of:

modulating each of a plurality of antenna output signals with an auxiliary modulation signal;

phase-shifting each of said modulated antenna output signals so that the phase of each of said output signals are approximately the same;

summing each of said modulated and phase-shifted antenna output signals together, wherein a summation signal is thereby generated;

receiving said summation signal by amplifying and selecting said summation signal in a receiver circuit;

filtering said received summation signal;

demodulating said filtered received summation signal in amplitude and frequency demodulators;

coherently detecting the demodulated signals from said amplitude and frequency demodulators in synchronous demodulators, wherein the output of said amplitude demodulator is coherently detected with said auxiliary modulation signal and the output of said frequency demodulator is coherently detected with said auxiliary modulation signal phase shifted by ninety degrees, whereby the amplitude and phase relationship of each of said antenna output signals is determined and therefrom the phase position and amplitude contribution of each of said antenna output signals in relation to said summation signal is derived; and adjusting the phase-shift of each of said antenna output signals by means of the information derived from said synchronous demodulators so that said summation signal is optimized for maximum resulting amplitude and best reception.

2. Receiving method according to claim 1, characterized in that the phase of each of said antenna output signals is changed in dependence upon the phase position determined in predetermined phase states.

3. Receiving method according to claim 2, characterized in that the phase of each of said antenna output signals is changed depending on the phase position determined in such a manner that only unilateral directional antenna patterns are generated.

4. Receiving method according to claim 1, characterized in that the phase of each of said modulated antenna output signals is rotated in the direction of the phase of the summation signal.

5. Receiving method according to claim 4, characterized in that the individual antenna patterns are at least approximately circular patterns.

6. Receiving method according to claim 1, characterized in that the auxiliary modulation is consecutively superimposed on the individual antenna output signals in a predetermined clock sequence.

7. Receiving method according to claim 6, characterized in that the clock sequence of the clock signal is of the order of magnitude of milliseconds.

8. Receiving method according to claim 6, characterized in that the clock sequence of the clock signal depends on the speed of a vehicle.

9. Receiving method according to claim 8, characterized in that the signal for controlling the clock sequence of the clock signal is derived from vehicle tachometer.

10. Receiving method according to claim 6, characterized in that the clock sequence of the clock signal is controlled by the useful signal.

11. Receiving method according to claim 10, characterized in that the clock sequence of the clock signal is triggered on occurrence of the zero passage of the useful signal.

12. Receiving method according to claim 1, characterized in that from the antenna output signals linear combinations are formed on which the auxiliary modulation is superimposed.

13. Receiving method according to claim 12, characterized in that an approximately omnidirectional antenna pattern is formed by linear combination of said antenna output signals.

14. Receiving method according to claim 1, characterized in that said auxiliary modulation signal frequencies occur in an unused frequency range of a transmission channel.

15. Receiving method according to claim 1, characterized in that the antenna output signals contain frequency-modulated stereo multiplex signals and that the antenna output signals modulated with the auxiliary modulation contain the auxiliary modulation in a frequency range about 57 kHz and/or around 17 and/or 21 kHz of the stereo multiplex signal.

16. Receiving method according to claim 1, characterized in that the phase difference between the respective individual signal and the summation signal and/or the amplitude contribution of an individual signal to the amplitude of the summation signal is converted to a digital signal.

17. Receiving method according to claim 16, characterized in that the phase difference is quantized with 2 or 3 bits.

18. Receiving method according to claim 1, characterized in that an antenna output signal is deactivated when the amplitude contribution from the antenna output signal to the summation signal drops below a predetermined threshold value.

19. Receiving method according to claim 1, characterized in that the auxiliary modulation is superimposed on the respective antenna output signals during a defined time interval for each of said antenna output signals.

20. Receiving method according to claim 19, characterized in that said antenna output signals are video signals and that the auxiliary modulation signal modulates each of said antenna output signals during the respective line or frame blanking interval of each of said antenna output signals.

21. Receiving method according to claim 1, further comprising the step of activating an antenna output signal when said signal is above a predetermined interference threshold or deactivating an antenna output signal when said signal is below a predetermined interference threshold.

22. Receiving method according to claim 1, further comprising the step of modulating said summation signal with a further predetermined defined auxiliary modulation, said modulation of said summation signal is used as a calibration signal for adjusting the calibration of receiver circuits.

23. Receiving method according to claim 22, characterized in that the further auxiliary modulation is identical to the auxiliary modulation which is superimposed on the individual antenna output signals.

24. Receiving method according to claim 22, characterized in that the further auxiliary modulation used for the calibration is superimposed on a summation signal which is formed from a subset of the antenna output signals and which comes closest to the summation signal resulting after the change of the phase and/or amplitude of the individual signal.

25. Receiving method according to claim 1, characterized in that an antenna output signal is modulated with a modified auxiliary modulation signal, wherein said antenna output signal appears to be shifted in phase an amount determined by said modified auxiliary modulation signal.

26. Receiving method according to claim 1, further comprising the step of modulating said summation signal by simultaneous modulation of all the antenna output signals, wherein said modulation of said summation signal is used as a calibration signal for adjusting the calibration of receiver circuits.

27. Apparatus for diversity reception of radio signals using a plurality of receiving antennas where the signal from each receiving antenna is modulated by an auxiliary modulation signal, phase shifted, combined in a summation circuit, amplified and selected in a radio receiver, coherently demodulated, then used to control the amount of phase shift made to each antenna output signal such that the resultant signal summation is maximized for best reception, comprising:
a plurality of receiving antennas (1-1, 1-2, 1-3, 1-4);
a modulator (3) connected to said receiving antennas (1-1, 1-2, 1-3, 1-4) and modulating each of the signals from said receiving antennas with an auxiliary modulation signal ($S_H$), wherein each of the modulated signals has an auxiliary modulation component;
a phase setting member (4) connected to said modulator (3) and adapted to phase-shift each of the modulated signals from said modulator (3);
a summation circuit (5) connected to said phase setting member (4) and adapted to sum the modulated and phase-shifted signals from said phase setting member (4) into a summation signal, wherein the summation signal is comprised of the phase shifted antenna signals and auxiliary modulation components thereto;
a receiving circuit (7) connected to said summation circuit (5) and adapted to amplify and select the summation signal therefrom;
a filter (8) connected to the receiving circuit (7) for filtering the auxiliary modulation components from the summation signal;
first and second demodulators (9, 10) connected to said filter (8) and which demodulate auxiliary modulation components in the summation signal;
first and second synchronous demodulators (11, 12) connected to said first and second demodulators, respectively, said synchronous demodulators (11, 12) determining from the auxiliary modulation components, the real and imaginary parts of each of the signals from said receiving antennas (1-1, 1-2, 1-3, 1-4) in relation to the summation signal and derives therefrom the phase position and amplitude contribution of each of the antenna signals to the summation signal; and
a phase controller connected to said synchronous demodulators (11, 12) and converting the phase position and amplitude contribution for each antenna signal into control signals for controlling said phase setting member (4), whereby the individual antenna signals are phase-shifted so as to optimize the summation signal for maximum amplitude and best reception.

28. Receiving antenna system according to claim 27, characterized in that said phase controller is an analog/digital converter.

29. Receiving antenna system according to claim 27, characterized in that the modulator (3) is activated consecutively by means of a clock generator (14).

30. Receiving antenna system according to claim 27, characterized in that with each antenna output signal a separate auxiliary modulation signal generator each having a different frequency and in each case separate synchronous demodulators are associated, whereby each separate synchronous demodulator determines the real and imaginary parts of the respective antenna output signal associated with the respective auziliary modulation signal.

31. Receiving antenna system according to claim 27, further comprising a matrix circuit (2) connected between the individual receiving antennas (1-2, 1-2, 1-3, 1-4) and said modulator (3), said matrix circuit (2) forms linear combinations of the antenna output signals resulting in more uniform antenna reception pattern or improved summation of the antenna output signals.

32. Receiving antenna system according to claim 27 wherein said first and second demodulators (9, 10) consist of amplitude and frequency demodulators, respectively.

33. Receiving antenna system according to claim 32, characterized in that the amplitude demodulator (9, 11) is a quasi synchronous demodulator.

34. Receiving antenna system according to claim 27 further comprising a post summation modulator (18) connected between the summation circuit (5) and the receiving circuit (7) and connected to auxiliary modulation (16) for modulating the summation signal with the auxiliary modulation signal ($S_H$).

* * * * *